(12) United States Patent
LoRocco et al.

(10) Patent No.: US 8,713,807 B2
(45) Date of Patent: May 6, 2014

(54) SIGHTING DEVICE WITH SELECTABLE PIN LIGHTING

(75) Inventors: Paul LoRocco, Dallas, TX (US); John Estridge, Plano, TX (US); Damon Lamont Coalson, Dallas, TX (US)

(73) Assignee: TruGlo, Inc., Richardson, TX (US)

( * ) Notice: Subject to any disclaimer, the term of this patent is extended or adjusted under 35 U.S.C. 154(b) by 32 days.

(21) Appl. No.: 13/422,146

(22) Filed: Mar. 16, 2012

(65) Prior Publication Data

US 2013/0242593 A1    Sep. 19, 2013

(51) Int. Cl.
 *F41G 1/467*    (2006.01)
(52) U.S. Cl.
 USPC .............................. 33/265; 362/110; 124/87
(58) Field of Classification Search
 USPC ............... 362/551, 110–114; 33/265; 42/111, 42/113, 132, 136, 123, 131; 124/87
 See application file for complete search history.

(56) References Cited

U.S. PATENT DOCUMENTS

| | | | |
|---|---|---|---|
| 6,494,604 B2 | 12/2002 | Khoshnood | |
| 6,609,306 B2 * | 8/2003 | Johnson et al. | 33/265 |
| 6,892,462 B2 * | 5/2005 | Rager | 33/265 |
| 7,100,292 B2 * | 9/2006 | Afshari | 33/265 |
| 7,503,122 B2 * | 3/2009 | Afshari | 33/265 |
| 7,503,321 B2 * | 3/2009 | Afshari | 124/87 |
| 7,549,230 B2 * | 6/2009 | Rager | 33/265 |
| 7,574,810 B1 * | 8/2009 | LoRocco | 33/265 |
| 7,631,433 B2 * | 12/2009 | Labowski | 33/265 |
| 2005/0150119 A1 * | 7/2005 | Ellig et al. | 33/265 |
| 2005/0183272 A1 * | 8/2005 | Meadows | 33/265 |
| 2005/0235503 A1 * | 10/2005 | Afshari | 33/265 |
| 2009/0235540 A1 * | 9/2009 | Rager | 33/265 |

* cited by examiner

*Primary Examiner* — Jong-Suk (James) Lee
*Assistant Examiner* — Leah S Macchiarolo
(74) *Attorney, Agent, or Firm* — Alvin R. Wirthlin

(57) ABSTRACT

A selective light assembly for a sighting device associated with an archer bow or the like has a plurality of light collectors, such as optical fibers, that serve as sight points. An artificial light source is adapted for projecting radiant energy in a direction toward the light collectors and a base member is operatively associated with the light source. The base member has at least one window adapted for alignment with at least one of the light collectors. At least one of the light source and base member is adjustable between first and second positions, such that the radiant energy projects through the base member and onto first and second light collectors for selectively illuminating a sight dot associated with one of the light collectors.

21 Claims, 11 Drawing Sheets

SIGHTING DEVICE WITH SELECTABLE PIN LIGHTING

BACKGROUND OF THE INVENTION

This invention relates generally to sighting devices for firearms, archery bows, or other projectile launching devices, and more particularly to a sighting device having sight pins that can be selectively illuminated by a single light source.

Sighting devices using short segments of light gathering optical fibers to form aiming points at different distances from the target are currently in use. Such optical fibers are typically fluorescent-doped and thus have the capability of gathering ambient light along their length and transmitting that light to their ends. Under ideal lighting conditions, one end of the optical fiber typically serves as a bright aiming point with the brightness being directly dependent on the level of ambient light incident on the length of optical fiber. Since the ambient light equally affects the brightness of all the sight points, confusion can occur when selecting the correct sight point for a particular distance between the target and the user.

SUMMARY OF THE INVENTION

In accordance with one aspect of the invention, a selective light assembly for a sighting device having a plurality of light collectors includes a light source adapted for projecting radiant energy in a direction toward the light collectors and a base member operatively associated with the light source. The base member has at least one window adapted for alignment with at least one of the light collectors. At least one of the light source and base member is adjustable to a first position such that the radiant energy projects through the base member and onto one of the light collectors and to a second position such that the radiant energy projects through the base member and onto another of the light collectors to illuminate the sight point of the one light collector or the sight point of the other light collector.

In accordance with a further aspect of the invention, an illuminated sighting device for an archery bow includes a bracket member for connection to the archery bow, a windage adjustment base connected to the bracket member, a sight assembly connected to the windage adjustment base, and a selective light assembly. The sight assembly includes a plurality of sight pins and a light collector associated with each sight pin such that a proximal end of the light collector forms a sight point on the sight pin. The selective light assembly includes a light source adapted for projecting radiant energy in a direction toward the light collectors and a base member operatively associated with the light source. The base member has at least one window adapted for alignment with at least one of the light collectors. At least one of the light source and base member are adjustable to a first position such that the radiant energy projects through the base member and onto one of the light collectors and to a second position such that the radiant energy projects through the base member and onto another of the light collectors to illuminate the sight point of the one light collector or the sight point of the other light collector.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

Figure 1:
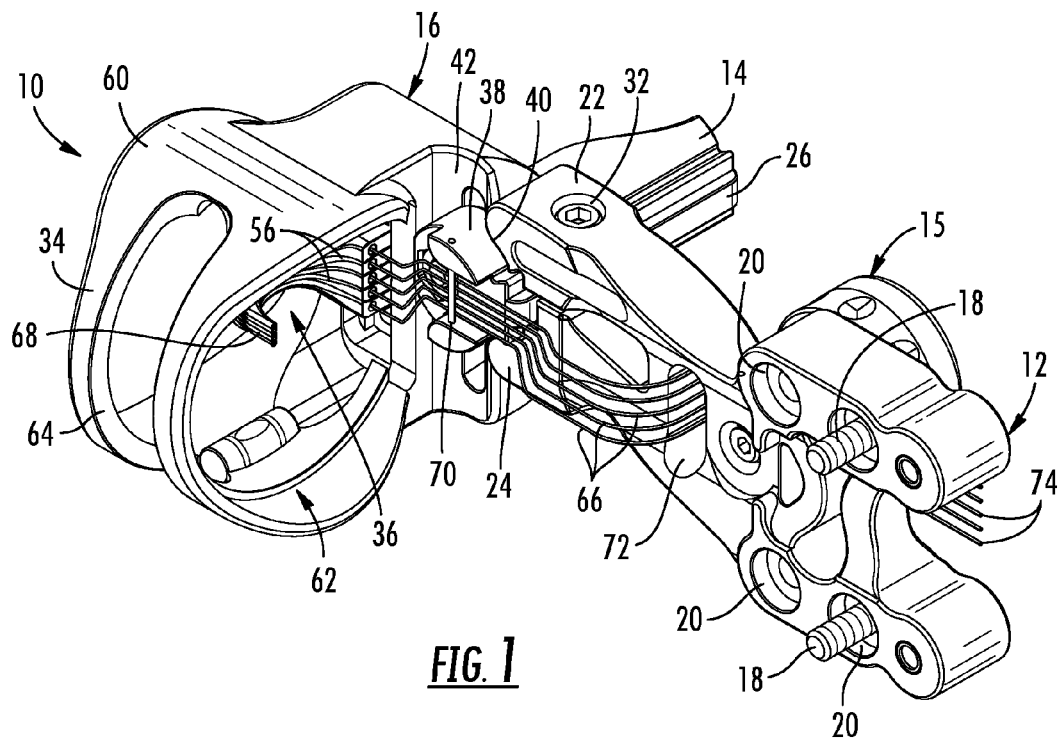
FIG. 1 is a left rear isometric view of an illuminated sighting device in accordance with an exemplary embodiment of the present invention.

It is noted that the drawings are intended to depict typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring to the drawings, and to FIGS. 1-4 in particular, an illuminated sighting device 10 in accordance with the present invention is illustrated. The sighting device 10 as shown is embodied as a bow sight. To this end, the sighting device 10 preferably includes a bracket member 12, a windage adjustment base 14 connected to the bracket member 12, a sight assembly 16 connected to the adjustment base 14, and a selective light assembly 15 connected to the bracket member 12 for illuminating portions of the sight assembly 16. The bracket member 12 is useful for attaching the sighting device to a bow (not shown) or the like via fasteners 18 that extend through openings 20 in the bracket member 12 and into the bow structure (not shown) in a conventional manner. However, it will be understood that the sighting device 10 may be adapted for use with any projectile launching device such as a rifle, pellet gun, BB gun, pistol, paint marker, and the like, and can be adapted for use with other devices, such as telescopes, sighting scopes, and so on, in order to quickly align the device with a distal target or scene.

The bracket member 12 preferably includes an upper jaw portion 22 and a lower jaw portion 24 with dovetail-shaped grooves 23 and 25 (FIG. 4), respectively, that receive a complementary dovetail-shaped projection 26 of the adjustment base 14. A bolt 32 extends through an opening in the upper jaw portion 22 and into a threaded opening of the lower jaw portion 24. Preferably, rotation of the bolt 32 in a clockwise direction draws the jaws 22, 24 toward each other to clamp around the base 14 at a desired position with respect to the bracket member 12 while rotation of the bolt in a counter-clockwise direction causes the jaws to move away from each other for adjusting the linear or windage position of the base 14 with respect to the bracket member 12. Although not shown, a windage scale can be provided on the adjustment base 14 for displaying the relative position between the bracket member 12 and base 14. By way of example, it may be necessary to adjust the lateral position of the sight assembly 16 during windy conditions and/or when calibrating the sighting device 10 for use with a particular bow, arrow and/or other device or projectile.

The sight assembly 16 preferably includes a frame portion 34 connected to the adjustment base 14 and a sight portion 36 connected to the frame portion 34. The adjustment base 14 preferably includes an outer jaw portion 37 and an inner jaw portion 38 with a dovetail-shaped slot 40 formed therebetween that receives a complementary dovetail-shaped projection 42 of the frame portion 34. A bolt 44 (FIG. 4) extends through the outer jaw portion 37, a vertically extending slot 39 formed in the dovetail-shaped projection 42 and into a threaded opening of the inner jaw portion 38. Preferably, rotation of the bolt 44 in a clockwise direction draws the jaws 37 and 38 toward each other to clamp around the projection 42 base so that the sight assembly 16 is vertically adjustable and locked to a desired position with respect to the base 14 and bracket member 12. Conversely, rotation of the bolt in a counter-clockwise direction causes the jaws to move away from each other for adjusting the vertical position of the sight assembly 16 with respect to the base 14 and thus the bracket member 12. Although not shown, a height scale can be provided on the frame portion 34 for displaying the relative position between the sight assembly 16 and the adjustment base 14. Vertical adjustment of the entire sight assembly 16 may be needed when initially calibrating the sighting device 10 with a particular bow or other device, when changing from one arrow type to another, when shooting from different heights, such as from the ground or a tree stand, and so on.

The sight assembly 16 also preferably includes a plurality of sight pins 56 which are connected to the frame portion 34 with bolts 46 (FIGS. 2 and 4) that extend through vertically extending slots 48, 50 formed in a side wall 52 of the frame portion 34 and into a threaded opening (not shown) of each sight pin 56 in a well-known manner. In this manner, each sight pin 56 is independently adjustable in a vertical direction to accommodate a particular bow strength and arrow type for different yardages or distances to a target.

The frame portion 34 preferably has an annular wall 60 that forms a sight window 62 through which the sight pins 56 and a distal target can be viewed. An elongate, curved opening 64 can be provided in the annular wall 60 to reduce the weight of the sighting device 10.

Figure 2:
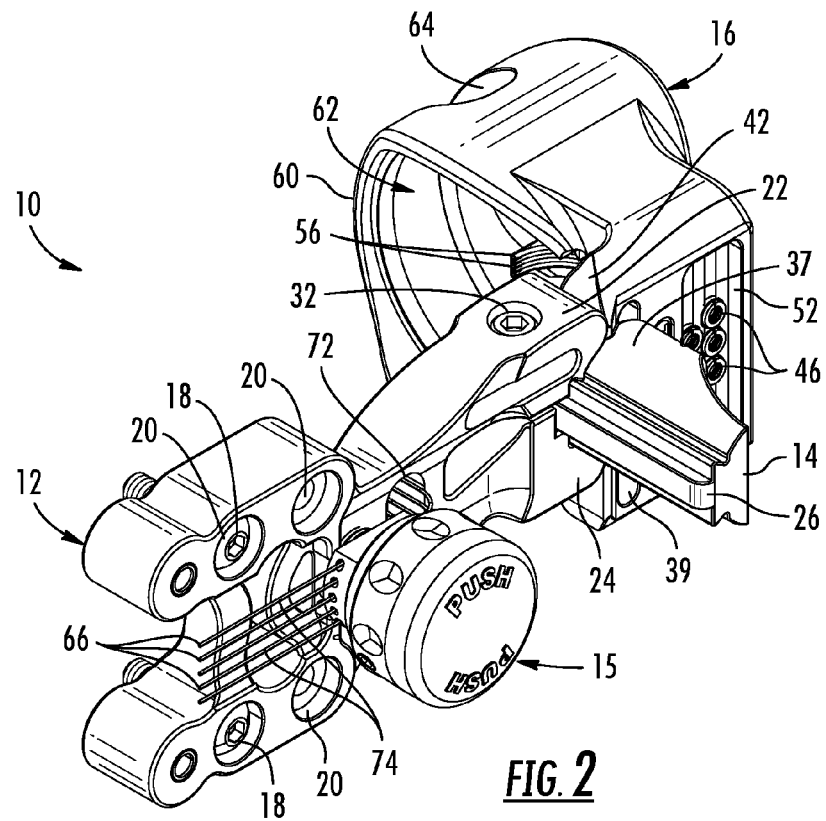
FIG. 2 is a right rear isometric view thereof.

As best shown in FIGS. 1 and 2, the sight pins 56 are vertically spaced to demark different target distances. For example, the top pin can be used to demark a target at 25 yards, the next pin can be used to demark a target at 50 yards, and so on. Although five separate sight pins 56 are shown, it will be understood that more or less sight pins may be provided without departing from the spirit and scope of the invention.

Each sight pin 56 is associated with an elongate light collector 66 that terminates at a tip 68 of each sight pin and extends behind a retaining member 70 associated with the adjustment base 14, rearwardly along the bracket member 12, and through an elongate opening 72 formed in the bracket member. A distal end portion 74 of each light collector 66 extends through the selective light assembly 15 and preferably terminates rearwardly of the selective light assembly. A protective sheath (not shown) can be provided over a portion of the light collector 66 or over the entire length thereof for protection against environmental conditions and contaminants. The proximal end of the light collector, which terminates at the tip 68 of the sight pin 56, serves as an illuminated sight point or dot during aiming. If desired, the proximal end of the light collector 66 can be formed with a lens for increasing the viewing capacity of the sight point.

The light collector 66 is preferably constructed of a fluorescent-doped optical fiber or the like. A suitable fluorescent-doped optical fiber may be constructed of a polystyrene-based core containing one or more fluorescent dopants that is surrounded by a polystyrene, polymethyl methacrylate, or fluoropolymer cladding. When such an optical fiber receives radiation along its length, energy is absorbed in the optical fiber at a certain wavelength and is re-emitted at both ends of the optical fiber at a longer wavelength. Thus, depending on the amount of radiation absorbed by the optical fiber along its length, a proportionate amount of radiation is emitted at the ends of the optical fiber.

Although the optical fiber is preferably circular in cross section, it is contemplated that other cross sectional shapes such as oval, triangular, rectangular, arcuate, etc., may be used. Moreover, it will be understood that the light collector 66 is not limited to the particular material as set forth in the exemplary embodiment. The core and cladding may be formed out of any suitable transparent or translucent materials, as long as the index of refraction of the core material is greater than the index of refraction of the cladding material. The cladding material itself may be air or other fluid surrounding at least a portion of the core material. Accordingly, it will be understood that the light collector may be in the form of a molded piece of plastic with or without a fluorescent dopant. It will be further understood that the length, diameter or thickness and the amount of dopant within the core of the light collector 66 can vary and depends on the desired brightness of the sight point as viewed by the user under varying ambient conditions.

Figure 3:
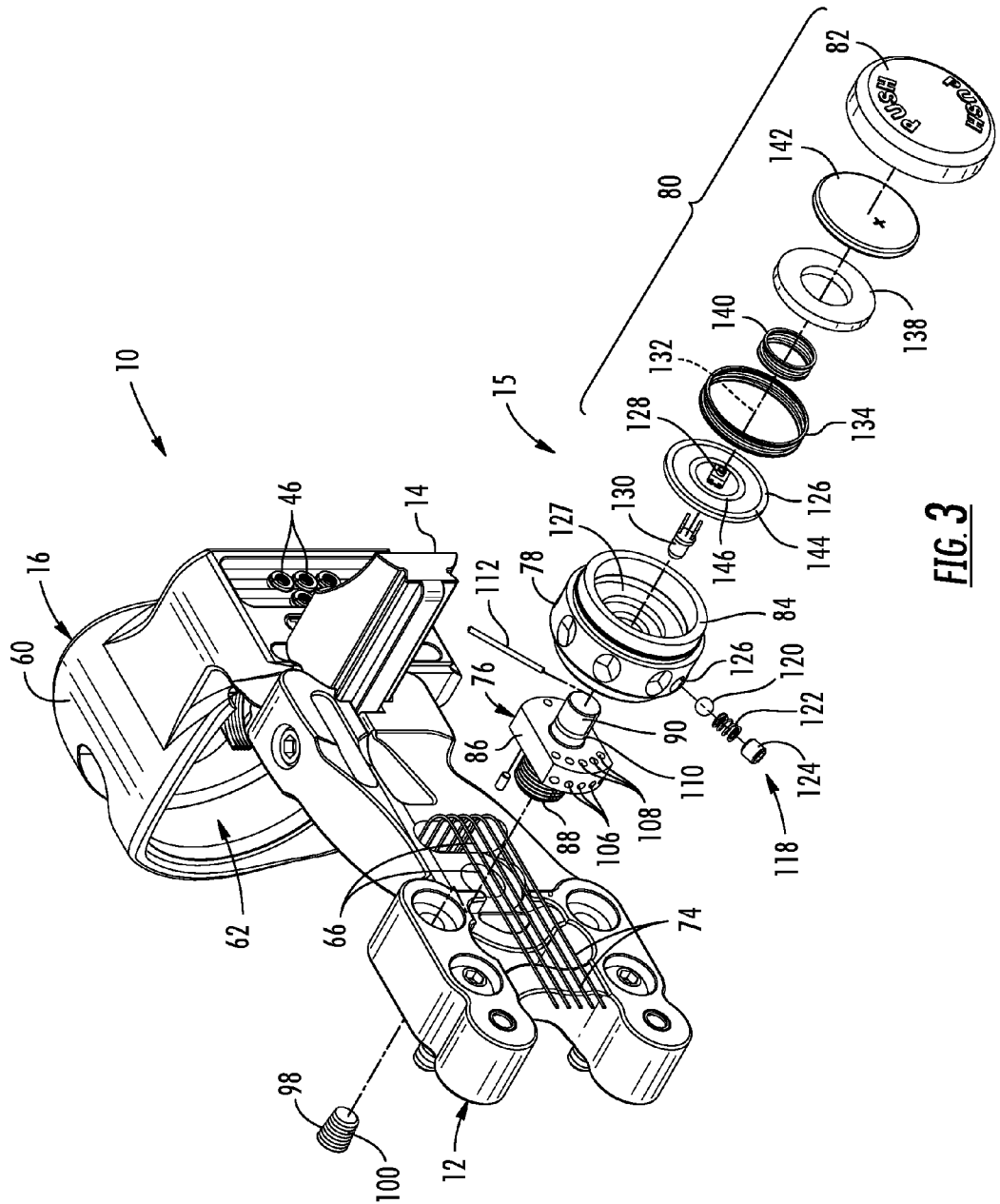
FIG. 3 is a right rear isometric view similar to FIG. 2 with a selective light assembly in exploded view.
Figure 4:
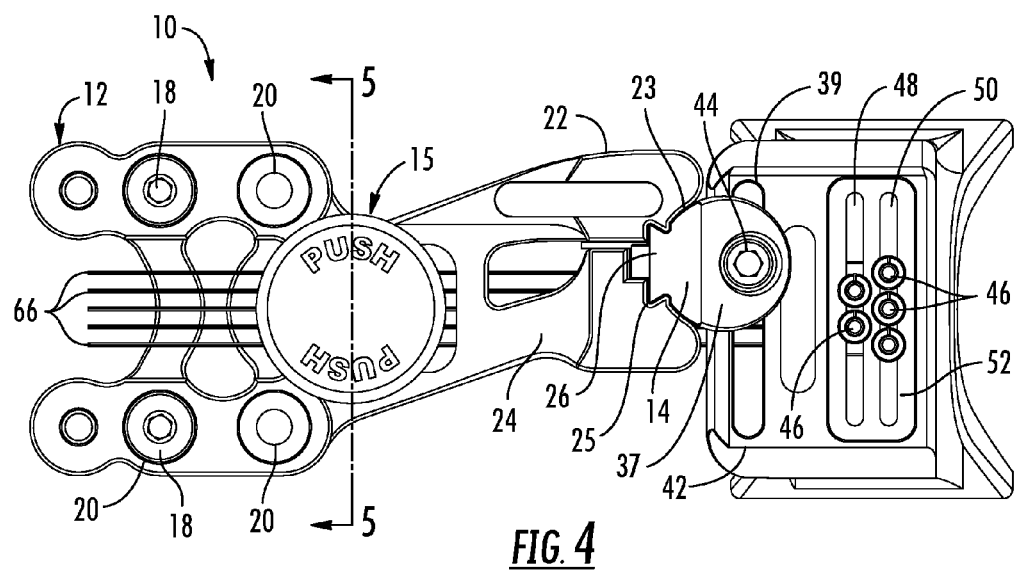
FIG. 4 is a right side elevational view of the sighting device.
Figure 5:
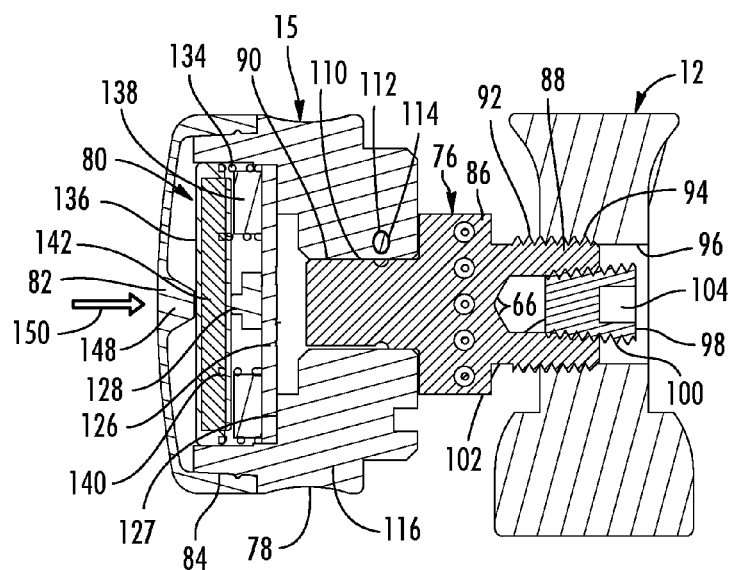
FIG. 5 is a sectional view of the sighting device taken along line 5-5 of FIG. 4.
Figure 6:
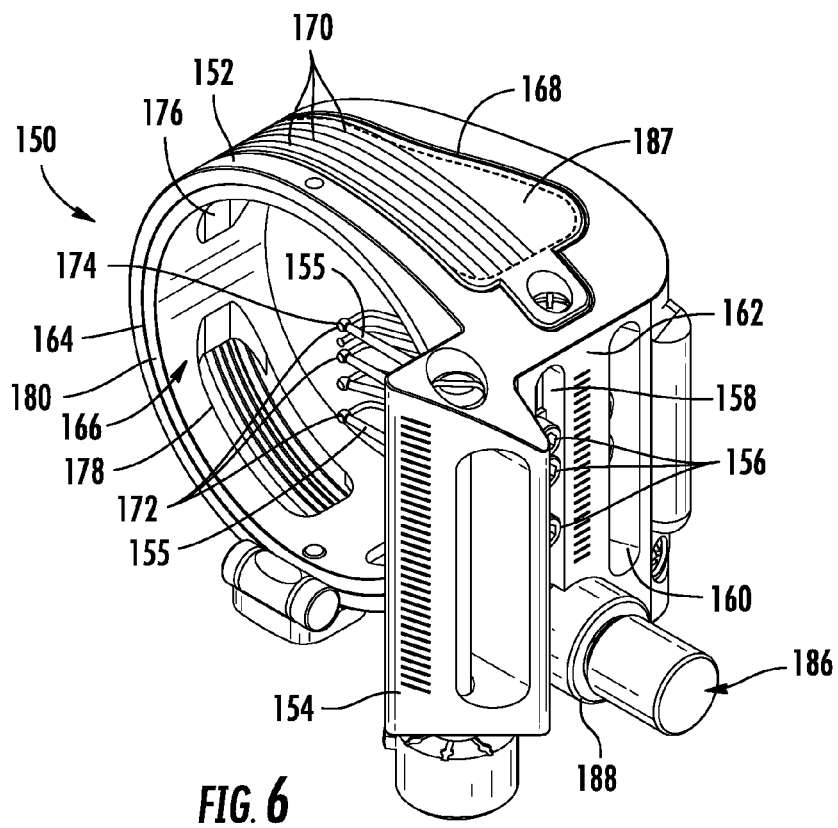
FIG. 6 is a right rear isometric view of an illuminated sight assembly in accordance with a further embodiment of the invention.
Figure 7:
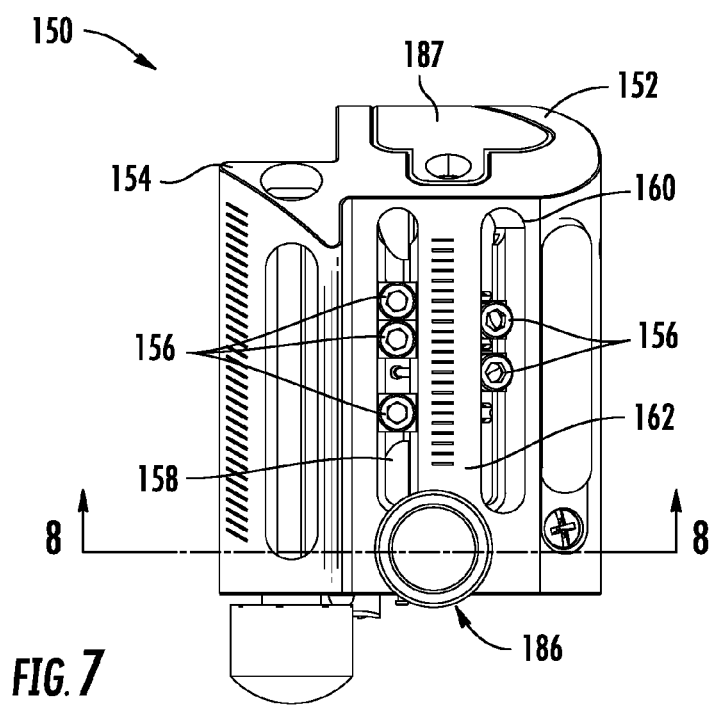
FIG. 7 is a right side elevational view thereof.

As best shown in FIGS. 3 and 5, the selective light assembly 15 preferably augments the light intensity of one of the sight points by enabling the user to select a particular sight point to be illuminated by a single artificial light source. The ability to selectively illuminate a particular sight point is advantageous to the archer or other user since it can reduce the confusion involved with selecting a particular sight point for a particular aiming condition when all of the sight points are of substantially the same intensity as in prior art arrangements. The ability to distinguish one sight point over another by increasing the brightness of the selected pin sight also ensures that the correct sight point is selected for a particular yardage or distance from the intended target. To that end, the selective light assembly 15 preferably includes a light blocking base member 76 connected to the bracket member 12, a housing 78 rotatably connected to the base member 76, a light module 80 located in the housing 78, and a cap or cover 82 that fits over a reduced end 84 of the housing 78 and covers the light module 80.

The base member 76 is preferably formed as a unitary part and includes a platform 86 with a mounting extension 88 that protrudes from one side thereof and a mounting shaft 90 that protrudes from the opposite side thereof. The mounting extension 88 preferably includes an outer threaded surface 92 that engages an inner threaded surface 94 formed in an opening 96 of the bracket member 12 to mount the selective light assembly 15 to the bracket member 12. A locking member 98 is located within the opening 96 and has an outer threaded surface 100 that mates with an inner threaded surface 102 of the mounting extension 88 to lock the base member 76 to the bracket member 12. A slot or depression 104 in the locking member 98 is adapted to receive a tool (not shown), such as a screwdriver or the like, to tighten and loosen the locking member 98 with respect to the base member 76.

A plurality of parallel cross apertures or bores 106 are formed in the platform 86 for receiving one or more of the light collectors 66. As shown, the light collectors preferably extend completely through the bores so that the distal end portions 74 (FIGS. 1 and 2) terminate outside of the base member 76. However, it will be understood that the bores 106 and/or their respective light collectors 66 can terminate within the platform 86 without departing from the spirit and scope of the invention. A plurality of axially extending apertures 108 are formed in a side surface 110 of the platform 86. Each aperture 108 intersects with one of the cross apertures or bores 106 and serves as a window or conduit so that artificial light from the light module 80 can be selectively projected into one of the apertures 108 and onto one of the light collectors 66 to illuminate one of the sight pin tips 68 (FIG. 1) with a greater intensity than the other sight pin tips.

A circular groove 110 is formed in the mounting shaft 90 and is adapted to receive a pin 112 that in turn extends through an elongate aperture formed in the side wall 114 of the housing 78. The pin 112 is preferably press-fit into the side wall 114 and extends across the annular groove 110 to both lock the base member 76 to the housing 78 and allow the housing 78 to rotate through a predetermined angle with respect to the base member. A detent mechanism 118 is associated with the housing 78 and includes a ball 120, compression spring 122, and set screw 124 located within an annular opening 126 of the housing 78. The ball 120 presses against the mounting shaft 90 under force from the spring 122. The shaft 90 in turn includes a plurality of contrasting surfaces (not shown) corresponding to the number of apertures 108 such that the rotational position of the housing 78 with respect to the shaft can be adjusted in discrete increments.

The light module 80 preferably includes a printed circuit board (PCB) 126 that is circular in shape and supported by an inner shoulder 127 of the housing 78. A push-button switch 128 is centrally located on one side of the PCB and a light source 130 is located on the opposite side thereof. The light source 130 is preferably offset from a central axis 132 of the light module 80 so that rotation of the housing 78 by a user causes the light source 130 to align, with help from the detent mechanism 118, with one of the axially extending apertures 108 in the base member 76. In this manner, only one of the light collectors 66 is exposed to radiant energy from the light source 130. Preferably, the light source 130 comprises a surface-mount LED that emanates radiant energy at a wavelength that is of greatest efficiency for fluorescent-doped optical fibers, such as in the visible ultraviolet range of wavelengths. However, it will be understood that the light source can comprise other wavelengths in the visible light spectrum or in the near-infrared spectrum when night vision equipment is used in conjunction with the sight device 10. It will be further understood that the invention is not limited to an LED but can alternatively include an incandescent bulb, tritium capsule, or other artificial light sources, without departing from the spirit and scope of the invention.

The light module 80 further includes a first or outer spring 134 that is compressed between the PCB 126 and the positive side of a button-cell battery 142 or other power source inside the housing 78. The outer spring 134 is in electrical contact with an outer ring 144 of the PCB and the positive side of the battery 142. A resilient, insulative guide washer 138 is also located in the housing over the PCB 126. A second or inner spring 140 is located in the guide washer 138 and is compressed between the PCB 126 and the negative side of the battery 142. The inner spring 140 is in electrical contact with an inner ring 146 formed on the PCB 126 and the negative side of the battery 142. In this manner, electrical power is supplied to the PCB for energizing the light source 130. As shown in FIG. 5, a protrusion 148 is formed on the cover 82 and is in contact with the battery 142. The cover 82 is preferably constructed of a resilient material so that when it is pressed in a direction as denoted by arrow 150 in FIG. 5, the protrusion 148 pushes the battery 142 against the push-button switch 128 to control electrical power to the light source.

In use, ambient light incident on the light collectors 66 is absorbed in the fluorescent-doped optical fibers and is re-emitted at their proximal and distal ends. Light emitted from the distal ends associated with the sight pin tips 68 to thereby serve as separate illuminated sight dots or points that are adjustable for different distances to a target for a particular bow and arrow or the like, as described above. When ambient light conditions are too low to effectively see the sight pin tips 68 or when the user desires to more clearly distinguish a selected sight pin tip, the light module 80 is activated by pressing the cap 82 inwardly in a direction as denoted by arrow 150 to energize the light source 130. The housing 78 can then be grasped by the thumb and forefinger of the user and rotated about the central axis 132 until the desired detent position is reached. The light from the light source 130 is directed through one of the axially extending apertures 108 of the base member 76 to impinge on one of the light collectors 66. The ends of the artificially illuminated light collector will be brighter than the ends of the remaining light collectors so that the selected sight pin tip 68 is brighter than the remaining tips. When it is desirous to select another tip, the housing 78 is rotated to another detent position. Although not shown, a scale or other markings can be located on the housing and/or bracket or other stationary member to denote a particular sight pin to be illuminated with the artificial light.

It will be understood that more or less light collectors and/or thus more or less detent positions can be provided without departing from the spirit and scope of the invention. In addition two or more of the fluorescent-doped optical fibers can have different dopant properties so that the illuminated sight dots project different colors of light to further reduce the confusion that may be associated with two or more closely spaced sight dots of the same color.

Moreover, it will be understood that the term "light collector" can refer to regular optical fibers that accept light only at their ends or fluorescent-doped optical fibers that accept light along their lengths and at their ends, as well as other light gathering or transmitting devices. Accordingly, the above-described exemplary embodiment of the invention can be arranged so that the light source projects radiant energy toward the distal end of one of the optical fibers or the like, without departing from the spirit and scope of the invention. In addition, although a single light collector is illuminated by the single light source in the above-described embodiment, it will be understood that more than one light collector can be illuminated, such as when the target falls within a distance between two sight pins 56.

Referring now to FIGS. 6-10, a sight assembly 150 in accordance with a further embodiment of the invention is illustrated. The sight assembly 150 is adapted for connection to a bracket member, such as bracket member 12 previously described, and therefore can include a sight frame portion 152 with a dovetail-shaped projection 154 for connection to an adjustment base, such as adjustment base 14 previously described, or other structure. A selective light assembly 186 is preferably mounted to a side wall 162 of the sight frame portion 152.

The sight assembly 150 also preferably includes a plurality of sight pins 155 which are connected to the sight frame portion 152 with bolts 156 (FIGS. 6 and 7) that extend through vertically extending slots 158, 160 formed in the side wall 162 of the frame portion 152 and into a threaded opening (not shown) of each sight pin 155 in a well-known manner. The frame portion 152 preferably has an annular wall 164 that forms a sight window 166 through which the sight pins 155 and a distal target can be viewed. Preferably, the sight pins 155 are mounted to the sight frame within the sight window 166. An outer circular channel 168 is formed in the annular wall 164 for receiving a plurality of light collectors 170 that function as a natural light source to create sight points or sight dots 172 at the proximal end of each light collector. The sight points 172 are in turn supported at the outer free end of each sight pin 155 (see FIGS. 6 and 8). If desired, the proximal end of each light collector 170 can be formed with a lens for increasing the viewing capacity of the sight point. Elongate, curved openings 176 and 178 can be provided in the sight frame portion 152 to both reduce the weight of the sight assembly 150 and allow additional light to impinge on the light collectors located within the channel 168. This is especially advantageous when the frame is constructed of an opaque material. However, it will be understood that the openings may also be provided when the frame is constructed of a translucent or transparent material. If desired, a ring 180 (FIG. 6) with reflective or light enhancing qualities may be provided on a rear surface of the sight frame portion 152 to enhance the outer boundary of the sight window 166 during low light conditions.

A protective transparent or translucent cover 187 is preferably constructed of a transparent material and is shaped to fit within the circular channel 168 so that an outer surface of the cover is flush with outer surfaces of the frame portion 152. The protective cover is not intended to be a light blocking or light intensifying member, but as a means of protecting the light collectors 170 located within the circular channel 168 against damage. Although the cover 187 is shown as a separate transparent member, the cover can alternatively comprise tape or a coating or component that can be directly applied or molded to the light collectors 170 within the channel 168. Where the light collectors are constructed of a sufficiently resistant material or where damage to the collectors is not a concern, the protective cover 187 can be eliminated.

Each elongate light collector 170 preferably extends from the outer free end 174 of its respective sight pin 155, around the frame portion 152 within the channel 168, extends through apertures 182 formed at circumferentially spaced locations in the side wall 162. The distal end portion 184 of each light collector 170 preferably faces the selective light assembly 186 and may be formed with a lens to increase its capacity to receive radiant energy from the selective light assembly.

As in the previous embodiment, the light collectors 170 are preferably constructed of a fluorescent-doped optical fiber or the like. However, the light collector can be constructed of a regular optical fiber without the fluorescent dopant material such that it is unaffected by ambient light impinging along its length.

Figure 8:
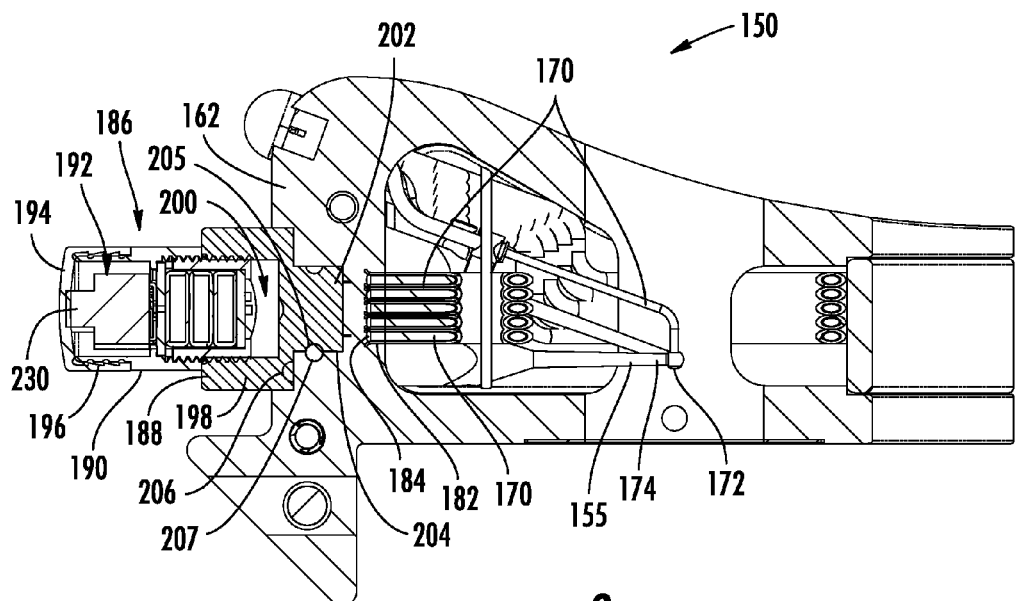
FIG. 8 is an enlarged sectional view of the sight assembly taken along line 8-8 of FIG. 7.
Figure 9:
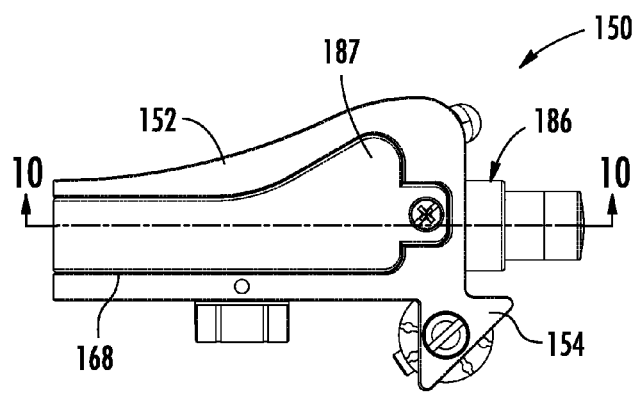
FIG. 9 is a top plan view of the sighting device of FIG. 6.
Figure 10:
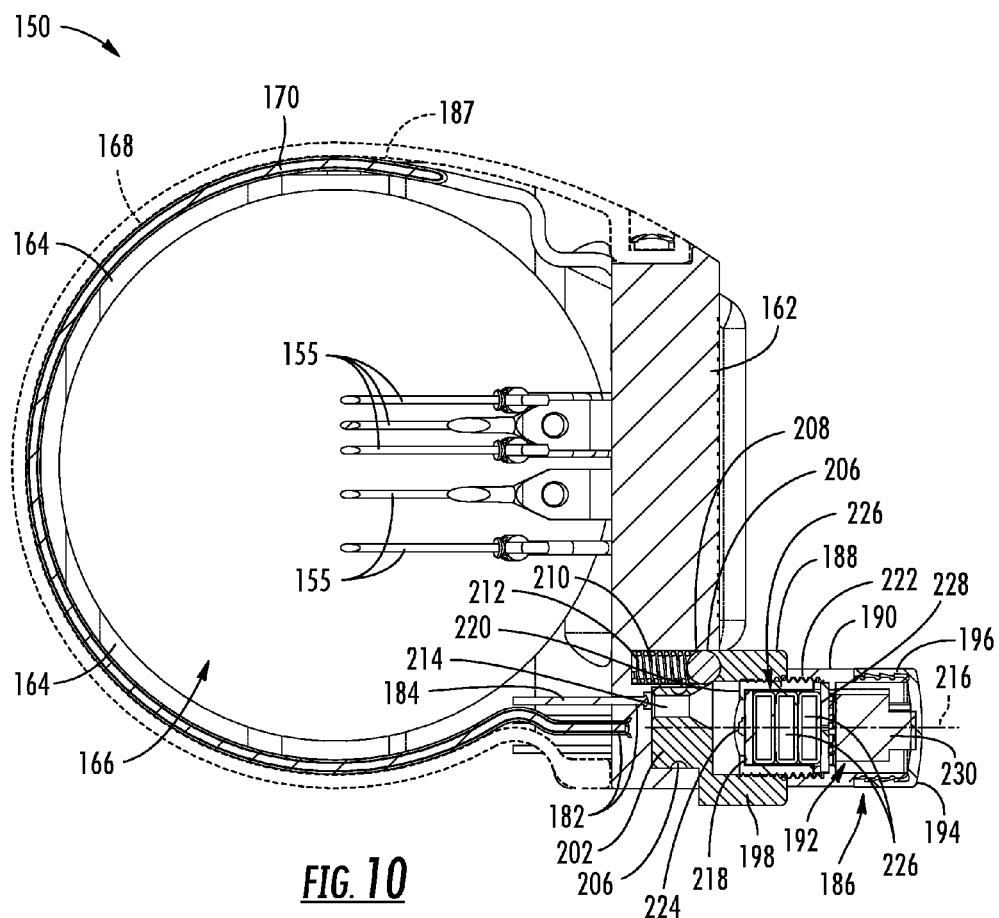
FIG. 10 is an enlarged sectional view of the sight assembly taken along line 10-10 of FIG. 9.
Figure 11:
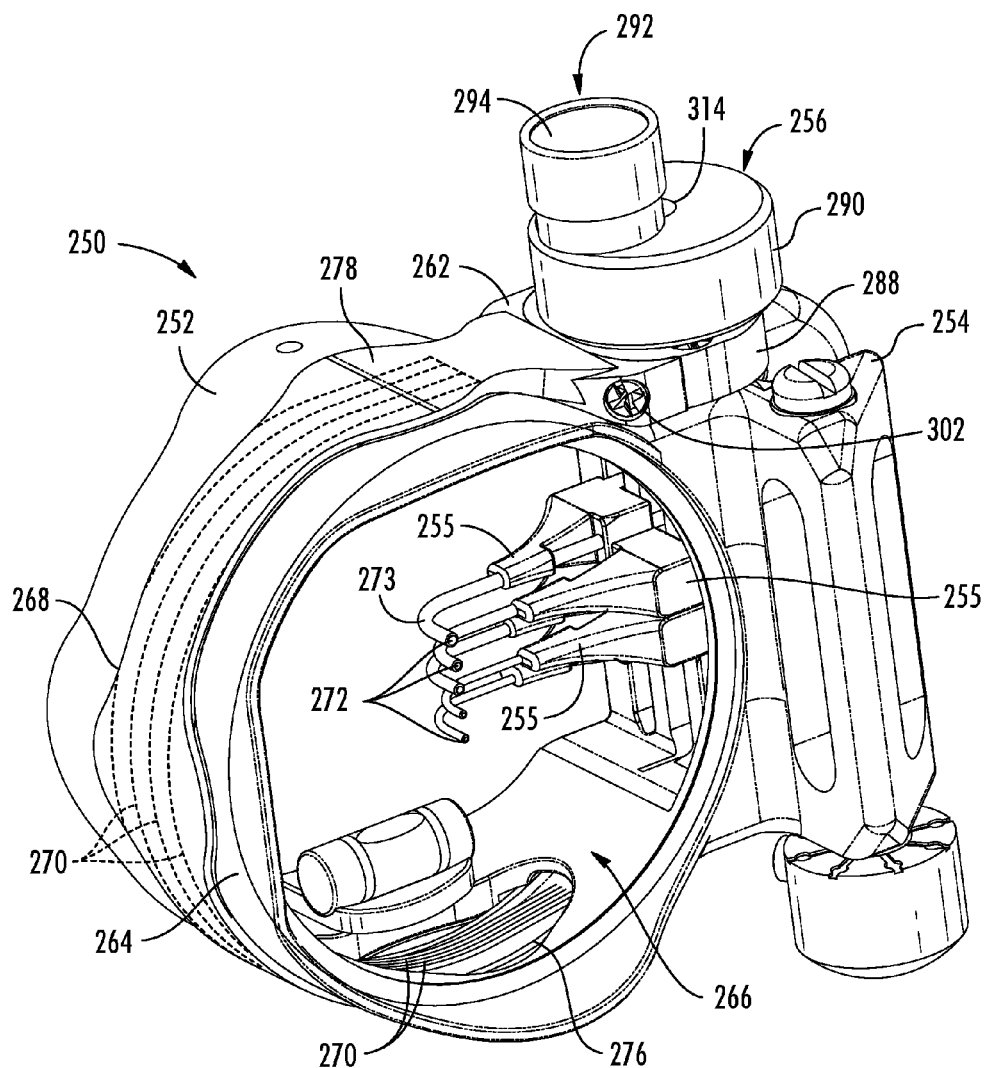
FIG. 11 is a left rear isometric view of an illuminated sight assembly in accordance with another embodiment of the invention.
Figure 12:
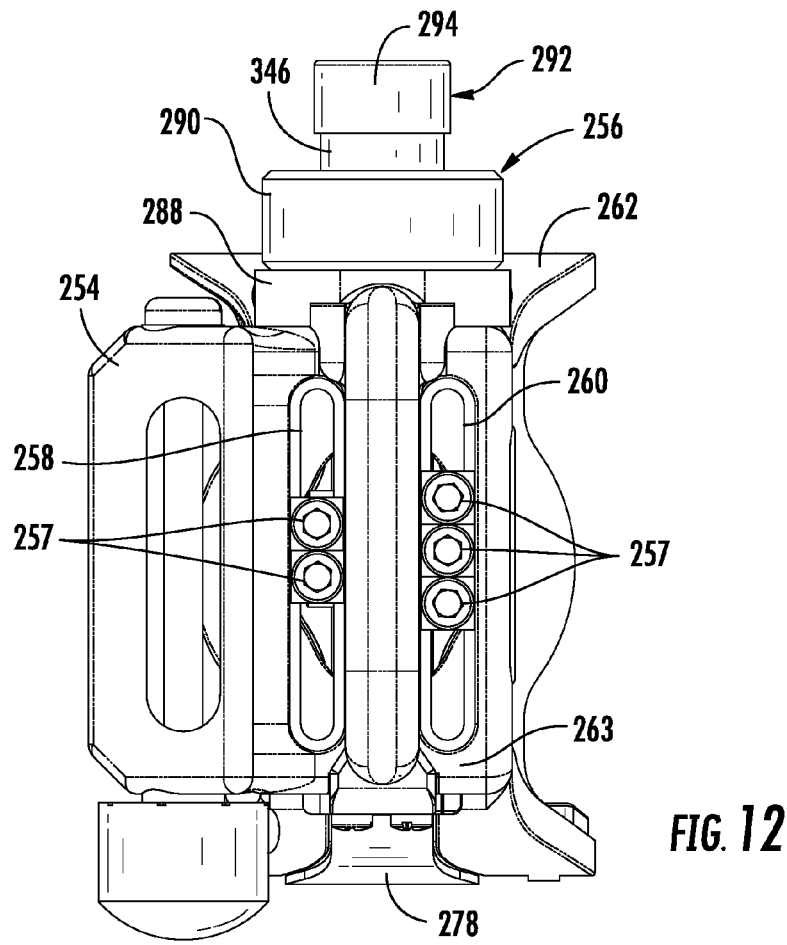
FIG. 12 is a right side elevational view thereof.
Figure 13:
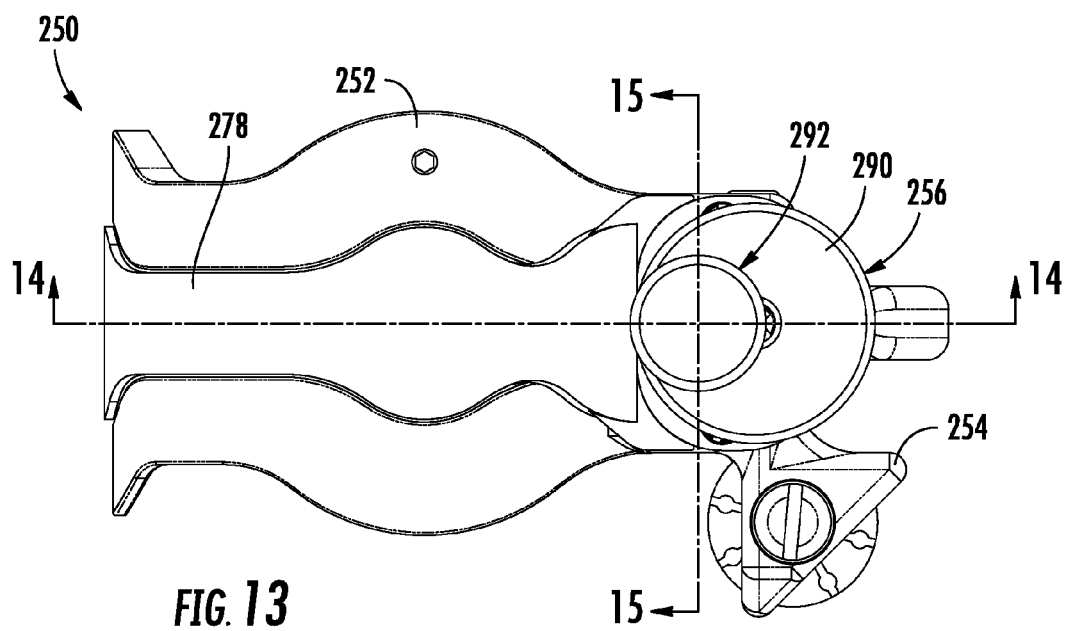
FIG. 13 is a top plan view thereof.

As best shown in FIGS. 8 and 10, the selective light assembly 186 preferably augments the light intensity of one of the sight points by enabling the user to select a particular sight point to be illuminated by an artificial light source, as in the previous embodiment. The selective light assembly 186 preferably includes a light blocking base member 188 rotatably connected to the side wall 162, a housing 190 connected to the base member 188, a light module 192 located in the housing 190, and a resilient or flexible cap or cover 194 that fits over a reduced end 196 of the housing 190 and covers the light module 192.

The base member 188 is preferably formed as a unitary structure and includes a circular wall 198 that forms a hollow interior 200 and a cylindrical projection 202 that is received into a cylindrical depression 204 of the side wall 162. An annular groove 205 is formed in the base member and a pin 207 extends into the groove from the side wall 162 to rotationally mount the base member 188 to the side wall. A detent mechanism is preferably associated with the base member 188 and includes a plurality of dimples 206 (only one shown) spaced peripherally around a portion of the projection 202, equal to the maximum number of light collectors that will be used for the sight assembly 150, a ball 208 received in one of the dimples 206, and a compression spring 210 located in a pocket 212 (FIG. 10) of the side wall 162 for applying pressure against the ball which in turn presses against the dimple 206 or cylindrical projection 202 depending on the rotational position of the base member 188. In this manner, the rotational position of the base member with respect to the side wall 162 can be adjusted in discrete increments. A countersunk aperture or bore 214 (FIG. 10) extends through the projection 202 and is offset from a rotational axis 216 of the selective light assembly 186. The offset bore 214 serves as a window or conduit for directing radiant energy from the light module 192 to the particular light collector 170 that is in alignment with the bore 214. The angled or countersunk portion of the bore ensures that more light is directed toward the aligned distal end of the light collector.

The light module 192 preferably includes an inner printed circuit board (PCB) 218 that is circular in shape and supported by an inner shoulder 220 of an inner housing portion 222 that preferably screws into the housing 190, which in turn screws into the base member 188. A light source 224 is preferably located on one side of the PCB and is aligned with the rotational axis 216. The light source 224 preferably comprises a surface-mount LED with a relatively wide conical angle so that a portion of the radiant energy from the LED is directed through the offset bore 214. In this manner, only one of the light collectors 170 is exposed to radiant energy from the light source 224. Preferably, the light source 224 emanates radiant energy at a wavelength that is of greatest efficiency for fluorescent-doped optical fibers, such as in the visible ultraviolet range of the electromagnetic spectrum. However, it will be understood that the light source can comprise other wavelengths in the visible light spectrum or in the near-infrared spectrum when night vision equipment is used in conjunction with the sight assembly 150. It will be further understood that the invention is not limited to an LED but can alternatively include an incandescent bulb, tritium capsule, or other artificial light sources, without departing from the spirit and scope of the invention. If desired, a lens can be formed or otherwise installed over the light source.

The light module 192 further includes a power source 226 located on the opposite side of the inner PCB 218. The power source 226 preferably includes a plurality of stacked button cell batteries 226 that are sandwiched between the inner PCB 218 and an outer PCB 228. A push-button switch 230 is preferably located on an opposite side of the outer PCB 228 and is in contact or close proximity to the cap 194 so that when the resilient cap is depressed by a user, the push-button switch 230 is actuated to control electrical power to the light source.

In use, ambient light incident on the light collectors 170 is absorbed in the fluorescent-doped optical fibers and is re-emitted at their proximal and distal ends. Light emitted from the proximal ends associated with the sight points 172 to thereby serve as separate illuminated sight dots or points that are adjustable for different distances to a target for a particular bow and arrow or the like, as described above. When ambient light conditions are too low to effectively see the sight pin points 172 or when the user desires to more clearly distinguish a selected sight point, the light module 192 is activated by pressing the cap 194 inwardly to energize the light source 224. The housing 190 or base member 188 can then be grasped by the thumb and forefinger of the user and rotated about the central axis 216 until the desired detent position is reached. The light from the light source 224 is directed through the offset bore 214 of the base member 188 to impinge on the distal end of one of the light collectors 170. The ends of the artificially illuminated light collector will be brighter than the ends of the remaining light collectors so that the selected sight point 172 is brighter than the remaining sight points. When it is desirous to select another sight point, the housing 190 or base 188 is rotated to another detent position. Although not shown, a scale or other markings can be located on the housing and/or side wall 162 or other stationary member to denote a particular sight pin to be illuminated with the artificial light.

It will be understood that more or less light collectors and/or thus more or less detent positions can be provided without departing from the spirit and scope of the invention. In addition, two or more of the fluorescent-doped optical fibers can have different dopant properties so that the illuminated sight dots project different colors of light to further reduce the confusion that may be associated with two or more closely spaced sight dots of the same color.

Referring now to FIGS. 11-16, a sight assembly 250 in accordance with yet another embodiment of the invention is illustrated. The sight assembly 250 is adapted for connection to a bracket member, such as bracket member 12 previously described, and therefore can include a sight frame portion 252 with a dovetail-shaped projection 254 for connection to an adjustment base, such as adjustment base 14 previously described, or other structure. A selective light assembly 256 is preferably mounted to an upper wall 262 of the sight frame portion 252.

The sight assembly 250 also preferably includes a plurality of sight pins 255 which are connected to the sight frame portion 252 with bolts 257 (FIG. 12) that extend through vertically extending slots 258, 260 formed in the side wall 263 of the frame portion 252 and into a threaded opening (not shown) of each sight pin 255 in a well-known manner. As in the previous embodiments, the frame portion 252 preferably has an annular wall 264 that forms a sight window 266 through which the sight pins 255 and a distal target can be viewed. Preferably, the sight pins 255 are mounted to the sight frame within the sight window 266. A outer circular channel 268 is formed in the annular wall 264 for receiving a plurality of light collectors 270 that function as a natural light source to create sight points or sight dots 272 at their proximal ends which are located at the outer free ends 273 of the sight pins. If desired, the proximal end of each light collector 270 can be formed with a lens for increasing the viewing capacity of the sight point. Elongate, curved openings 276 (FIGS. 11 and 15) can be provided in the sight frame portion 252 to both reduce the weight of the sight assembly 250 and allow additional light to impinge on the light collectors located within the channel 268. A protective transparent or translucent cover 278 is preferably constructed of a transparent material and is shaped to fit within the circular channel 268 to protect the light collectors 270 while allowing ambient light to reach the light collectors, as previously described.

Each elongate light collector 270 preferably has a proximal end portion that is located at the outer free end 273 of its respective sight pin 255. Each light collector extends around the frame portion 252 within the channel 268, through the selective light assembly 256, and into a hollow interior 280 (FIG. 14) of the sight frame portion 252 where a distal end portion 282 of each light collector 270 terminates. As in the previous embodiments, the light collectors 270 are preferably constructed of a fluorescent-doped optical fiber or the like. However, the light collectors can be constructed of a regular optical fiber without the fluorescent dopant material such that it is unaffected by ambient light impinging along its length. As shown, each sight pin 255 can have a light collector 270 with a different diameter or cross dimension so that the sight point 272 with the greatest diameter is used for a target that is closer to the user while the light collector with a smaller diameter is used for a target that is further away from the user so that the superimposed sight point is proportional to the distance to the target, thereby increasing accuracy of more distant targets while reducing the superimposed size of the sight point on those targets.

Figure 14:
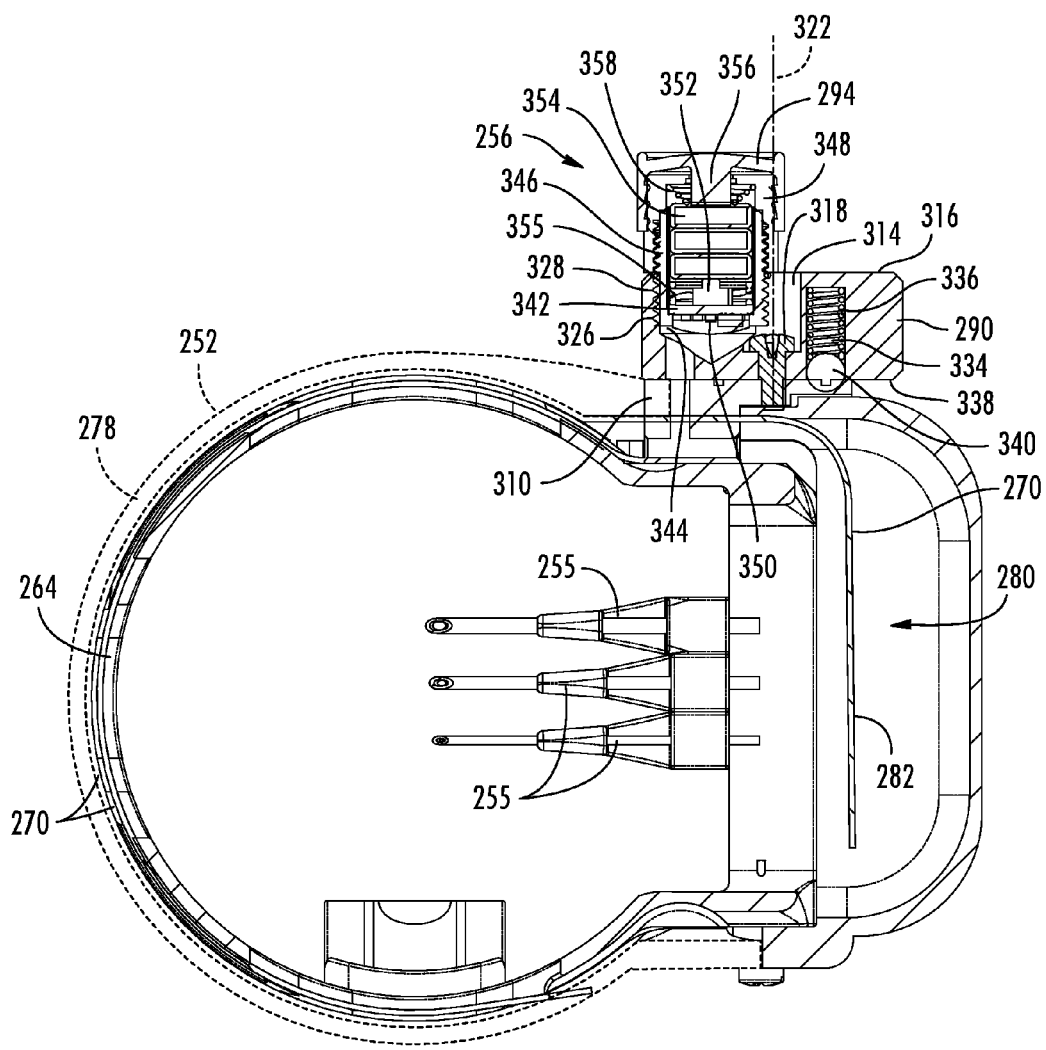
FIG. 14 is an enlarged sectional view of the sight assembly taken along line 14-14 of FIG. 13.
Figure 16:
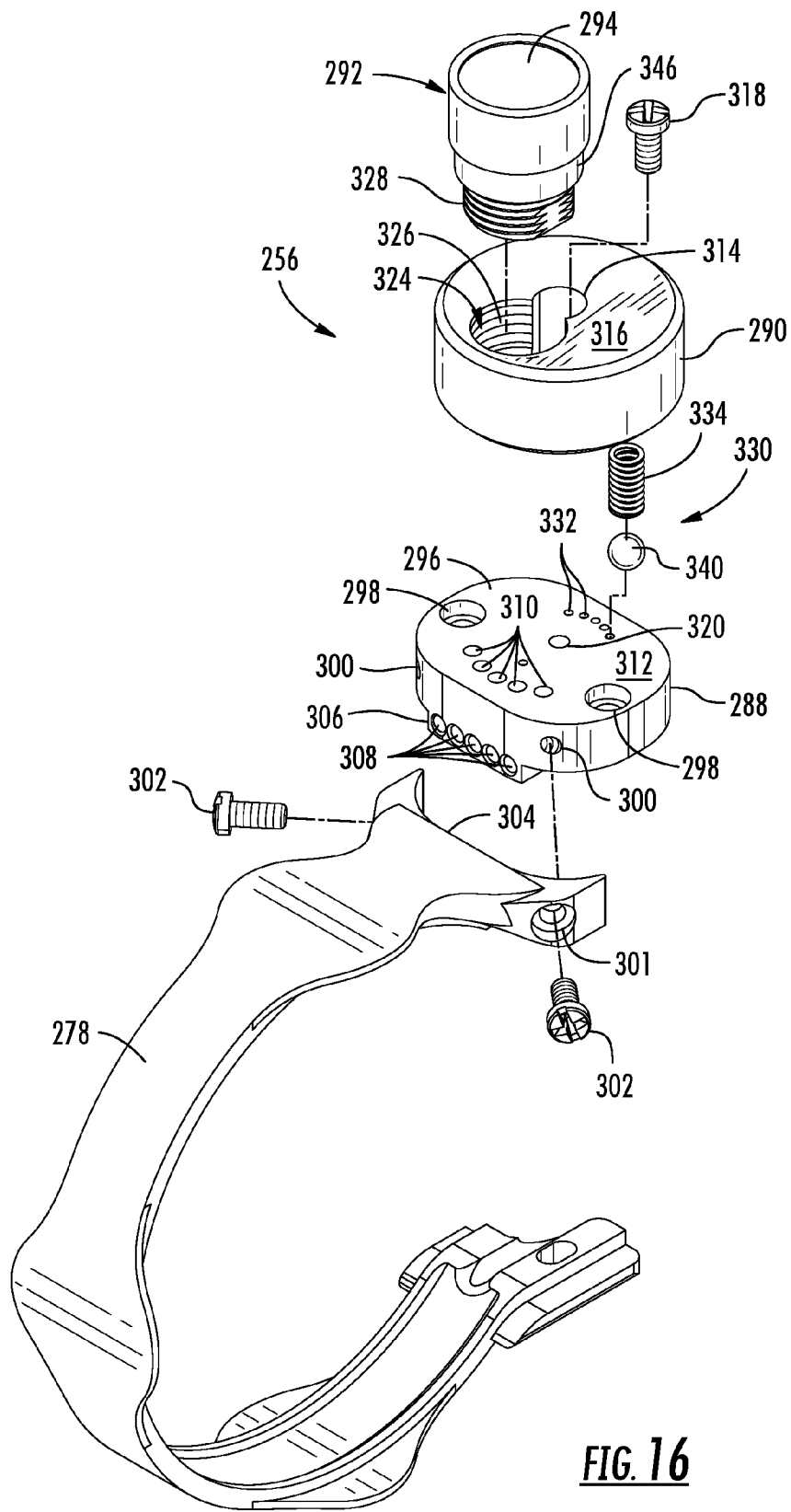
FIG. 16 is a right rear isometric exploded view of a portion of the sight assembly of FIG. 11.

As best shown in FIGS. 14 and 16, the selective light assembly 256 preferably augments the light intensity of one of the sight points by enabling the user to select a particular sight point to be illuminated by an artificial light source, as in the previous embodiments. The selective light assembly 256 preferably includes a light blocking base member 288 (FIG. 11) fixedly connected to the upper wall 262 of the sight frame portion 252, a housing 290 connected to the base member 288, a light module 292 mounted in the housing 290, and a resilient or flexible cap or cover 294 that fits over the housing 290 and covers the light module 292.

The base member 288 is preferably formed as a unitary structure and includes a generally flat platform 296 (FIG. 13) with a pair of openings 298 extending through a thickness thereof for receiving bolts or other fasteners (not shown) to mount the base member 288 to the upper wall 262 of the sight frame portion 252. Threaded apertures 300 extend into a side of the platform for receiving bolts 302 or other fasteners to connect the cover 278 to the platform through openings 301 (only one shown in FIG. 16) in the upper end 304 of the cover. The side of the platform and upper end 304 of the cover are preferably complementary in shape. A projection 306 extends downwardly from the platform 296 and includes a plurality of side apertures 308 that extend through the projection for receiving the distal end portions 282 of the light collectors 270. A plurality of transverse apertures 310 extend from a top surface 312 of the platform and intersect with the plurality of side apertures 308 so that each of the transverse apertures is optically connected to a corresponding side aperture. Each aperture serves as a window or conduit for directing light from the light source into the side apertures. The transverse apertures are preferably located along an arcuate pathway with respect to a rotational axis 322 (FIG. 14) of the housing 290.

A central opening 314 preferably extends into the housing 290 from a top surface 316 thereof. A bolt 318 or other fastener is located in the central opening and threads into a central opening 320 of the platform 296 so that the housing 290 rotates about the rotational axis 322 (FIG. 14). An offset bore 324 extends into the housing 290 from the top surface 316 and includes internal threads 326 for mating with the external threads 328 of the light module 292 for connecting the light module to the housing. It will be understood that the light module 292 can be connected to the housing through other well-known means including press-fitting, fasteners, adhesive bonding, magnets, welding, and so on, without departing from the spirit and scope of the invention. With this arrangement, when the housing is rotated about the rotational axis 322, the light module 292 will travel along an arcuate pathway in alignment with the transverse apertures 310 so that radiant energy is projected into one of the transverse apertures and onto one of the light collectors 270 located in the corresponding side aperture 308.

A detent mechanism 330 is preferably associated with the base member 288 and housing 290 and includes a plurality of dimples 332 equal to the maximum number of light collectors that will be used for the sight assembly 250. The dimples 332 are formed in the upper surface 312 of the platform 296 and are positioned at discrete locations along an arcuate pathway having a radial center coincident with the rotational axis 322. The detent mechanism also includes a ball 340 and compression spring 334 located in a bore 336 (FIG. 14) that extends into the housing 290 from the bottom surface 338 thereof. The spring 334 biases the ball 340 toward one of the dimples 332 or the top surface 312 of the platform 296 depending on the rotational position of the housing 280 with respect to the platform 296. In this manner, the rotational position of the housing with respect to the platform can be adjusted in discrete increments to ensure that the light module 292 is aligned with one of the transverse apertures 310.

Figure 15:
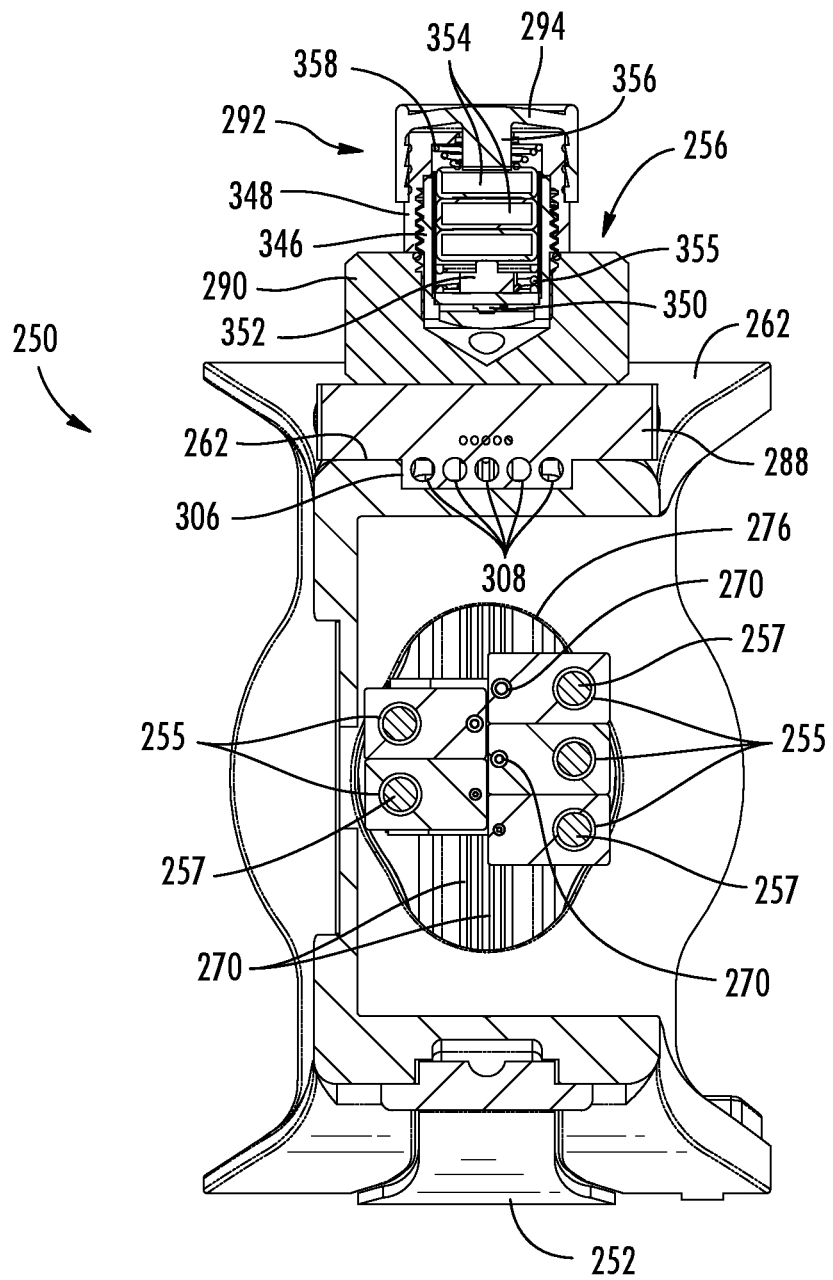
FIG. 15 is an enlarged sectional view of the sight assembly taken along line 15-15 of FIG. 13.

As shown in FIGS. 14 and 15, the light module 292 is somewhat similar to the light module 192 previously described, and preferably includes a printed circuit board (PCB) 342 that is circular in shape and supported by an inner shoulder 344 of an inner housing portion 346 that preferably screws into an outer housing portion 348. The inner housing portion 346 includes the external threads 328 for mounting the light module 292 to the housing 290. A light source 350 is preferably located on one side of the PCB and is offset from the rotational axis 322. The light source 350 preferably comprises a surface-mount LED with a relatively wide conical angle so that a portion of the radiant energy from the LED is directed through the offset bore 324. In this manner, only one of the light collectors 270 is exposed to radiant energy from the light source 350. Preferably, the light source 350 emanates radiant energy at a wavelength that is of greatest efficiency for fluorescent-doped optical fibers, such as in the visible ultra-violet range of the electromagnetic spectrum. However, it will be understood that the light source can comprise other wavelengths in the visible light spectrum or in the near-infrared spectrum when night vision equipment is used in conjunction with the sight assembly 250. It will be further understood that the invention is not limited to an LED but can alternatively include an incandescent bulb, tritium capsule, or other artificial light sources, without departing from the spirit and scope of the invention. If desired, a lens can be formed or otherwise installed over the light source. A push-button switch 352 is preferably located on an opposite side of the PCB 342 and is in contact or close proximity to a power source 354, which in this embodiment comprises stacked button cell batteries. The flexible cap 294 preferably includes a projection 356 that is in contact with or close proximity to the power source 354. An upper spring 358 is positioned between the negative side of the power source 354 and the upper housing 348 while a lower spring 355 can be positioned between the positive side of the power source 354 and the PCB 342. When the resilient cap 294 is depressed by a user, the push-button switch 352 is actuated to control electrical power to the light source 350.

Operation of the sight assembly 250 is similar in operation to the sight assemblies of the previous embodiments, and therefore will not be further described. It will be understood that more or less light collectors and/or thus more or less detent positions can be provided without departing from the spirit and scope of the invention. In addition, two or more of the fluorescent-doped optical fibers can have different dopant properties so that the illuminated sight dots project different colors of light to further reduce the confusion that may be associated with two or more closely spaced sight dots of the same color.

The above embodiments illustrate that the selective light assembly can be mounted on the bracket member and at various locations on the sight assembly. The above embodiments also demonstrate that moving the radiant energy from the light source from one light collector to another can also be accomplished in a variety of different ways, including moving the light source or moving a light blocking member while keeping the light source stationary, impinging the radiant energy across one of the light collectors, or directing the radiant energy toward the end of the light collector.

It will be further understood that other means for directing the radiant energy to one of the light collectors can be provided without departing from the spirit and scope of the invention, such as moving one, some, or all of the light collectors with respect to a stationary light source, or moving the light collectors, light blocking member or light source in a linear direction rather than an arcuate direction. In addition, a variable resistor, pulse width modulation, or the like can be operably associated with the selective light assembly for varying brightness of the artificial light source.

Furthermore, it will be understood that one or more portions of the selective sight assembly can be mounted remotely from the sighting device without departing from the spirit and scope of the invention. By way of example, the electrical switch for controlling the light source can be positioned remotely from the sighting device at a position that may be more convenient for an archer or other user. In this manner, the user can adjust the illuminated sight point while in an aiming position without the necessity of shifting the hand. The light source and/or power source can also or alternatively be located remotely from the sighting device and connected thereto via optical fibers, electrical wires, and so on.

It will be understood that the term "preferably" as used throughout the specification refers to one or more exemplary embodiments of the invention and therefore is not to be interpreted in any limiting sense. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. It will be understood, therefore, that the present invention is not limited to the particular embodiments disclosed, but also covers modifications within the spirit and scope of the invention as defined by the appended claims.

What is claimed is:

1. A selective light assembly for a sighting device having a plurality of light collectors, each light collector having one end forming a sight point, the selective light assembly comprising:
   a light source adapted for projecting radiant energy in a direction toward the light collectors; and
   a base member operatively associated with the light source, the base member having a window adapted for selective alignment with only one of the light collectors;

at least one of the light source and base member being selectively adjustable to a first position such that the radiant energy projects through the window of the base member and onto only one of the light collectors and to a second position such that the radiant energy projects through the base member and onto only another of the light collectors thereby illuminating only the sight point of the one light collector or only the sight point of the other light collector.

2. A selective light assembly according to claim 1, and further comprising a detent mechanism operably associated with the light source and the base member such that at least one of the light source and window of the base member is adjustable at discrete positions for selective alignment with each of the light collectors.

3. A selective light assembly according to claim 2, wherein the light source is adjustable with respect to the base member at the discrete positions such that the window of the base member is in alignment with only one of the light collectors at the discrete positions to thereby expose only the one light collector to the light source through the window, thereby selectively illuminating only one sight point associated with the one exposed light collector.

4. A selective light assembly according to claim 3, and further comprising:
 a light module having:
  a housing;
  a PCB located in the housing with the light source being connected to one side of the PCB;
  an electrical power source; and
  a switch connected between the power source and the light source to thereby selectively turn the power source on and off.

5. A selective light assembly according to claim 4, wherein the housing is rotatably coupled to the base member.

6. A selective light assembly according to claim 2, wherein the base member is adjustable with respect to the light collectors at the discrete positions such that the window of the base member is in alignment with the light source and only one of the light collectors at the discrete positions.

7. A selective light assembly according to claim 6, wherein the base member is rotatable with respect to the light collectors.

8. A selective light assembly according to claim 7, wherein the at least one window is offset from a rotational axis of the base member.

9. A selective light assembly according to claim 1, wherein the housing is rotatably coupled to the base member.

10. A selective light assembly according to claim 9, wherein the light source is offset from a rotational axis of the housing.

11. A selective light assembly according to claim 1, wherein at least one of the light collectors comprises one of a fluorescent-doped optical fiber and a non-fluorescent-doped optical fiber.

12. A selective light assembly according to claim 1, wherein the radiant energy is directed towards a side of the light collectors.

13. A selective light assembly according to claim 1, wherein the radiant energy is directed towards an opposite end of the light collectors.

14. A selective light assembly for a sighting device having a plurality of light collectors, each light collector having one end forming a sight point, the selective light assembly comprising:
 a light source adapted for projecting radiant energy in a direction toward the light collectors; and
 a base member operatively associated with the light source, the base member having at least one window adapted for alignment with at least one of the light collectors;
 at least one of the light source and base member being adjustable to a first position such that the radiant energy projects through the base member and onto one of the light collectors and to a second position such that the radiant energy projects through the base member and onto another of the light collectors thereby illuminating the sight point of either the one light collector or the sight point of the other light collector;
 wherein the base member comprises a plurality of windows, each window being aligned with one of the light collectors, such that the light source projects radiant energy into only one of the windows to artificially illuminate only one of the light collectors.

15. A selective light assembly according to claim 14, wherein the base member further comprises a plurality of cross apertures for receiving the light collectors, the cross apertures intersecting with the windows such that the light source projects radiant energy onto the one light collector.

16. An illuminated sighting device for an archery bow, the sighting device comprising:
 a bracket member for connection to the archery bow;
 a windage adjustment base connected to the bracket member;
 a sight assembly connected to the windage adjustment base, the sight assembly comprising:
  a plurality of sight pins;
  a light collector associated with each sight pin such that a proximal end of the light collector forms a sight point on the sight pin; and
 a selective light assembly operably associated with the light collectors, the selective light assembly comprising:
  a light source adapted for projecting radiant energy in a direction toward the light collectors; and
  a base member operatively associated with the light source, the base member having at least one window adapted for alignment with at least one of the light collectors;
  at least one of the light source and base member being adjustable to a first position such that the radiant energy projects through only one window of the base member and onto only one of the light collectors and to a second position such that the radiant energy projects through only one window of the base member and onto only another of the light collectors thereby illuminating the sight point of only the one light collector or the sight point of only the other light collector, respectively.

17. An illuminated sighting device according to claim 16, wherein the selective light assembly is mounted to the bracket member.

18. An illuminated sighting device according to claim 16, wherein the sight assembly further comprises a frame portion that defines a sight window, the selective light assembly being mounted to the frame portion.

19. An illuminated sighting device according to claim 16, and further comprising a detent mechanism operably associated with the light source and the base member such that at least one of the light source and base member is adjustable at discrete positions for alignment with each of the light collectors.

20. An illuminated sighting device according to claim 19, wherein the at least one window comprises a plurality of windows, each window being in alignment with only one of the light collectors, with the light source being adjustable with respect to the base member at the discrete positions so that the radiant energy projects through only one window of the plurality of windows at each of the discrete positions to thereby illuminate only one of the light collectors at a time.

21. An illuminated sighting device according to claim 19, wherein the base member is adjustable with respect to the light collectors such that the window is in alignment with only one of the light collectors at the discrete positions to thereby illuminate only the one light collector.

* * * * *